United States Patent [19]

Tzikas

[11] Patent Number: 4,547,575

[45] Date of Patent: Oct. 15, 1985

[54] VAT DYES OBTAINABLE BY BROMINATION OF DIBENZANTHRONE AND REACTION WITH 1-AMINOANTHRAQUINONE

[75] Inventor: Athanassios Tzikas, Pratteln, Switzerland

[73] Assignee: Ciba-Geigy Corporation, Ardsley, N.Y.

[21] Appl. No.: 467,541

[22] Filed: Feb. 17, 1983

[30] Foreign Application Priority Data

Feb. 24, 1982 [CH] Switzerland .......................... 1133/82

[51] Int. Cl.[4] ................... C07D 221/18; C07D 221/22
[52] U.S. Cl. ......................................... 546/30; 8/650; 260/356; 260/694; 548/417
[58] Field of Search ............................ 548/417; 546/30

[56] References Cited

U.S. PATENT DOCUMENTS

| | | | |
|---|---|---|---|
| 2,232,700 | 2/1941 | Fleysher | 548/417 |
| 2,456,589 | 12/1948 | Lytle | 546/30 |
| 3,008,962 | 11/1961 | Jorre | 546/30 |
| 3,917,640 | 11/1975 | Fitzpatrick et al. | 548/417 |
| 4,405,785 | 9/1983 | Fitzpatrick et al. | 546/30 |

FOREIGN PATENT DOCUMENTS 703294 2/1954 United Kingdom .
703296 2/1954 United Kingdom .

*Primary Examiner*—Donald G. Daus
*Assistant Examiner*—Cecilia Shen
*Attorney, Agent, or Firm*—Edward McC. Roberts; Kevin T. Mansfield

[57] ABSTRACT

Vat dyes which dye cellulosic material in a grey or black shade of good fastness properties are obtained by brominating dibenzanthrone in 80–100% sulfuric acid to a bromine content of 24 to 32%, and reacting the bromination product with 1-aminoanthraquinone.

8 Claims, No Drawings

VAT DYES OBTAINABLE BY BROMINATION OF DIBENZANTHRONE AND REACTION WITH 1-AMINOANTHRAQUINONE

The present invention relates to vat dyes which are obtainable by brominating dibenzanthrone under special conditions and reacting the bromination product with 1-aminoanthraquinone, to a process for the preparation of these vat dyes, and to the use of said dyes for dyeing cellulose.

It is already known from British Pat. No. 703 296 that dibenzanthrone can be brominated with bromine in the presence of anhydrous aluminium halide, and British Pat. No. 703 294 teaches that the bromination product so obtained can be reacted with 1-aminoanthraquinone to give a blue vat dye.

Intermediates for the preparation of a higher condensed vat dye are disclosed in U.S. Pat. No. 2 232 700, which intermediates are obtained by reacting 1 equivalent of dibromodibenzanthrone with at least 2 equivalents of 1-aminoanthraquinone. The dibromodibenzanthrone employed as starting material is prepared by brominating dibenzanthrone in chlorosulfonic acid with elementary bromine and in the presence of a small amount of a halogen carrier such as sulfur or iodine.

However, the dyes obtained according to these patent specifications from brominated dibenzanthrone and 1-aminoanthraquinone do not produce the desired clear, neutral grey or black shades on cellulosic material. The dyeings obtained with the dyes of U.S. Pat. No. 2 232 700 are reddish blue in shade, and those obtained with the dyes of British Pat. No. 703 294 are dull. In addition, these dyes stain polyester yellow, so that they are of only limited use for dyeing blends of cellulose and polyester.

It is an object of the present invention to provide grey or black vat dyes which dye cellulosic material in a clear grey or black shade and which, when dyeing blends of cellulose and polyester, do not colour the polyester component or at least colour it in the same shade as the cellulose component.

This object is accomplished with the dyes of the present invention. It has been found that the constitution and properties of the dyes obtained by reacting brominated dibenzanthrone with 1-aminoanthraquinones depend on the constitution of, and thus on the method of preparing, the brominated dibenzanthrone, as well as on the conditions of the condensation with 1-aminoanthraquinone.

Accordingly, the invention provides vat dyes which are reaction products of brominated dibenzanthrone and 1-aminoanthraquinone, which dyes are obtainable by brominating dibenzanthrone with bromine in 80–100% sulfuric acid and in the presence of a bromination catalyst to a bromine content of 24 to 32%, and reacting the bromination product with 1.5 to 2.0 moles of 1-aminoanthraquinone per mole of brominated dibenzanthrone.

It is a further object of the present invention to provide a process for preparing vat dyes which are reaction products of brominated dibenzanthrone and 1-aminoanthraquinone, which process comprises brominating dibenzanthrone with bromine in 80–100% sulfuric acid and in the presence of a bromination catalyst to a bromine content of 24 to 32%, and reacting the bromination product with 1.5 to 2.0 moles of 1-aminoanthraquinone per mole of brominated dibenzanthrone.

It is preferred to carry out the bromination in 90–100% sulfuric acid, most preferably in 96–98% sulfuric acid, with sufficient bromine such that, on completion of bromination, i.e. when no more free bromine can be detected, the brominated dibenzanthrone has a bromine content of 24 to 32%, preferably of 26 to 30%. To achieve this end about 20 to 25% less bromine than the theoretical amount is required, as a portion of the bromide obtained is oxidised to bromine under the reaction conditions and is thus available once more for the reaction.

The reaction temperature of the bromination is preferably in the range from about 60° to 110° C., most preferably from 80° to 105° C., and the reaction time is from about 5 to 25 hours and, in the temperature range from 85° to 105°, from about 10 to 15 hours.

The bromination is carried out in the presence of a bromination catalyst, e.g. $FeBr_3$, finely powdered iron or, in particular, iodine, in an amount of about 0.1 to 10% by weight, preferably 0.5 to 2% by weight, based on dibenzanthrone.

When the reaction is complete, the brominated dibenzanthrone is isolated in conventional manner, e.g. by pouring the reaction mixture into ice water and isolating the residue by filtration.

The brominated dibenzanthrone is subsequently reacted with 1-aminoanthraquinone, using 1.5 to 2.0 moles, preferably 1.6 to 1.9 moles, of 1-aminoanthraquinone per mole of brominated dibenzanthrone. The reaction is conveniently carried out in an inert solvent, e.g. nitrobenzene, and at elevated temperature, e.g. in the range from about 180° to 220° C.

A preferred embodiment of the process consists in carrying out the reaction in the presence of an acid acceptor and a condensation catalyst.

Examples of suitable acid acceptors are sodium or potassium hydroxide, sodium or potassium acetate or sodium or potassium carbonate, or also mixtures thereof. Sodium carbonate is preferred.

Examples of condensation catalysts are copper compounds such as copper oxide or, preferably, copper(I) chloride.

After the condensation reaction, the dye is isolated in conventional manner, e.g. by removing the solvent by steam distillation and then collecting the residue by filtration and drying it.

The vat dyes obtained by the process described above are suitable for dyeing and printing a widely varying range of materials in grey or black shades, especially for dyeing and printing fibres of natural or regenerated cellulose in the presence of reducing agents, e.g. dithionite. The dyes have very good build-up and the dyeings obtained with them have good levelness and a clear shade. The fastness properties are in general very good, especially the fastness to light, water, chlorine and boiling soda.

A particular advantage of the vat dyes of this invention is that polyester fabric is not dyed at all or dyed grey to only an insignificant degree, so that they are very suitable for dyeing blends of cellulose and polyester.

The invention is illustrated by the following Examples in which parts and percentages are by weight.

EXAMPLE 1

(A) Bromination of dibenzanthrone

An agitator flask is charged with 994 parts of 98% sulfuric acid and 2 parts of iodine and then 200 parts of dibenzanthrone are slowly stirred in, whereupon the temperature rises to 40°–45° C. The reaction mixture is heated to 85°–90° C. and 124 parts of bromine are added dropwise at this temperature over 6 hours. Stirring is continued for 3 hours at 85°–90° C. and then for another 3 hours at 100°–105° C.

After it has cooled to 55°–60° C., the reaction mixture is poured into 1200 parts of ice/water and the precipitate is collected by filtration. The filter cake is washed with warm water until neutral and dried in vacuo at 80°–90° C.

Yield: 245 parts of brominated dibenzanthrone.
Bromine content: 29.1%.

(B) Reaction with 1-aminoanthraquinone 80 parts of anhydrous sodium carbonate, 150 parts of the brominated dibenzanthrone obtained in (A) and 95 parts of 1-aminoanthraquinone are stirred, in succession, into 1800 parts of nitrobenzene. The reaction mixture is heated to 195°–205° C. and 14 parts of copper(I) chloride are added in portions over 5 hours. Stirring is continued for another 6 hours at 195°–205° C., then the reaction mixture is cooled to 80° C. and the nitrobenzene is removed by steam distillation. The residue is isolated by filtration, washed with hot water until neutral and free of bromide, and dried in vacuo at 100° C.

Yield: 221 parts of dye which dyes cotton grey or black. The dye has a nitrogen content of 3.0% (theory: 3.1%) and a bromine content of less than 0.5% (theory: 0.0%). The mass spectrum shows a m/e value of 899 (molecular peak).

EXAMPLES 2 TO 4

The procedure described in Example 1 is repeated, reacting the amount of brominated dibenzanthrone indicated in column 2 of the following table and having the bromine content given in column 3, with the amount of 1-aminoanthraquinone indicated in column 4, to give dyes which dye cotton in the shade indicated in the last column

| Example | Parts of brominated dibenzanthrone | Bromine content [%] | Parts of 1-aminoanthraquinone | Shade |
| --- | --- | --- | --- | --- |
| 2 | 150 | 26 | 85 | grey |
| 3 | 150 | 27 | 95 | grey |
| 4 | 150 | 32 | 95 | bluish grey |

EXAMPLE 5

(A) 2 parts of the dye of Example 1 are vatted at 50°–70° C. with 10 parts by volume of sodium hydroxide having a specific gravity of 36° Bé and 5 parts of sodium hydrosulfite in 200 parts of water. The above stock vat is added to a dyebath which contains in 2000 parts of water 5 parts by volume of sodium hydroxide solution with a specific gravity of 36° Bé and 3.7 parts of sodium hydrosulfite. 100 parts of cotton are put into this bath at 40° C. After 10 minutes, 15 parts of sodium chloride are added and after 20 minutes a further 15 parts are added and dyeing is performed for 45 minutes at 40° C. The cotton is squeezed out, oxidised, and finished in the usual manner. It is dyed in a clear grey shade of medium depth with very good fastness properties.

(B) The above procedure is repeated using 2 parts of the dye obtained according to Example 1 of British Pat. No. 703 294. The grey dyeing obtained on cotton has a markedly duller shade than that of the dyeing obtained above with the dye of this invention.

EXAMPLE 6

(A) 1 part of a finely dispersed dye powder containing 50% of the dye obtained in Example 1 and 1 part of a commercially available anionic dispersant are added to 200 parts of water, and the pH of this dyebath is adjusted to 6.0 to 6.4 with 2 parts of monosodium phosphate. Then 10 parts of a check polyester/cotton blend (65/35) are put into the dyebath at 50° C. The temperature of the dyebath is then raised to 125° C. over 45 minutes and dyeing is carried out for 60 minutes in a closed vessel at this temperature. The dyebath is then cooled to 60° C. and 2 parts by volume of sodium hydroxide solution having a specific gravity of 36° Bé and 1 part of sodium hydrosulfite are added. Dyeing is continued for another 30 minutes at 60° C. and the fabric is then oxidised and finished in the customary manner.

The cotton component of the blend is dyed in a bluish-grey shade and the polyester resist is very good. The polyester component is stained grey to only an insignificant degree.

(B) The above procedure is repeated using the dye obtained according to Example 1 of British Pat. No. 703 294. The cotton component of the blend is dyed in a bluish-grey shade, but the dyeing is markedly duller than that obtained in (A). The polyester component is stained in a dirty yellow shade.

What is claimed is:

1. A process for the preparation of a vat dye which is a reaction product of brominated dibenzanthrone with 1-aminoanthraquinone, which process comprises brominating dibenzanthrone with bromine in 80–100% sulfuric acid and in the presence of a bromination catalyst to a bromine content of 24 to 32%, and reacting the bromination product with 1.5 to 2.0 moles of 1-aminoanthraquinone per mole of brominated dibenzanthrone.

2. A process according to claim 1, which comprises carrying out the bromination in sulfuric acid having a concentration of 96–98%.

3. A process according to claim 1, which comprises carrying out the bromination to a bromine content of 26 to 30%.

4. A process according to claim 1, wherein iodine is used as bromination catalyst.

5. A process according to claim 1, which comprises reacting the bromination product with 1.6 to 1.9 moles of 1-aminoanthraquinone per mole of brominated dibenzanthrone.

6. A process according to claim 1, which comprises carrying out the reaction of brominated dibenzanthrone with 1-aminoanthraquinone in the presence of an acid acceptor and of a condensation catalyst.

7. A process according to claim 6, wherein sodium carbonate is used as acid acceptor and a copper compound as condensation catalyst.

8. The process of claim 1 wherein the sulfuric acid has a concentration of 90–100%.

* * * * *